UNITED STATES PATENT OFFICE.

JAMES R. REID, OF ELMIRA, NEW YORK.

FILTERING MATERIAL.

SPECIFICATION forming part of Letters Patent No. 644,637, dated March 6, 1900.

Application filed November 20, 1899. Serial No. 737,678. (No specimens.)

*To all whom it may concern:*

Be it known that I, JAMES R. REID, a citizen of the United States, residing at Elmira, in the county of Chemung and State of New York, have discovered and produced a new and useful Filtering Material, of which the following is a specification.

My discovery relates to the production from a peculiar carbonaceous earth of a substitute for animal charcoal or bone-black as a filtering material.

The particular earth utilized by me is found in swamps at rather high elevations and, so far as I at present know, has been found only in the vicinity of the boundary-line between the States of New York and Pennsylvania. These swamps are found in basins into which the wash from the surrounding hills has been carried, the carbonaceous earth lying therein in a stratum resting upon a stratum of blue clay and generally covered by a deposit of vegetable mold from six inches to two feet deep. This carbonaceous-earth stratum varies in thickness from a few inches to about thirty inches or perhaps thicker, although I have never as yet found it thicker than that. This earth is very dark, a bluish black in color, and when freshly cut, in which state it is in a moist condition, it has a greasy appearance, water standing on it in drops, as upon a greased surface. Its specific gravity is about 2.06, varying somewhat in different localities and even in spots in the same swamp. It is composed of silica, argillaceous earth, and vegetable and nitrogenous matter. Chemical analysis shows it to have the following constituents: water, 8.82; organic matter, 26.20; animal matter, 64.98; total, 100. Of this 0.65 per cent. is nitrogen, equivalent to 0.80 per cent. of ammonia. When subjected to destructive distillation a mineral black of the following composition is obtained: carbon, 9.40; phosphoric acid, 0.45; silica, 52.72, the remainder consisting of alumina and iron oxid, with some small amount of carbonate of lime.

The silicates and vegetable and nitrogenous matters are contained in the requisite proportions to produce when carbonized a powerful decolorant. The silica exists in a finely-granulated porous condition. It not only acts as an absorbent, but renders the calcined product hard and durable. It will also be noted that the amount of carbon shown after calcination in closed vessels is about the same as found in animal charcoal.

In producing the filtering material from this earth the earth after being dug from the swamp is first dried out either by natural or artificial means, when it becomes hard, like stone. It is then broken into small particles and placed in closed vessels and submitted to calcination after the manner employed in the production of animal charcoal, the products of distillation being carried off and utilized for the production of ammonia and other by-products. The resultant from this calcination is a hard black extremely-porous material, preserving the form of the original substance, and it may afterward be ground or pulverized to various degrees of fineness, according to commercial requirements. As a filtering medium it has been found by experiment to be an absorbent for lime and as a decolorant to equal and in some respects surpass animal charcoal.

Vegetable oils and raw-sugar syrup when filtered through this material have been found to be more perfectly clarified than when passed through bone-black, and I have also found that this material will stand recalcination better than bone-black.

While I am aware that the existence of this peculiar earth has long been known and that several attempts have been made to utilize it— in fact, a black paint was at one time manufactured from it, but with little success—I believe that I am the first to discover and develop its properties as a filtering medium of commercial value and to originate a process of manufacture whereby it may be turned into a valuable and vendible product of this nature.

Having thus described my new filtering material and the process of manufacturing it, what I claim, and desire to secure by Letters Patent, is—

1. A filtering material consisting of calcined carbonaceous swamp-earth, substantially as set forth.

2. A filtering material consisting of calcined carbonaceous earth substantially as set forth.

In testimony whereof I have affixed my signature in presence of two witnesses.

JAMES R. REID.

Witnesses:
M. E. VERBECK,
A. S. DIVEN.